United States Patent [19]

Lauko

[11] 4,130,682

[45] Dec. 19, 1978

[54] SOUND ABSORBING DEVICE

[76] Inventor: John W. Lauko, 33 N. Center, Perry, N.Y. 14530

[21] Appl. No.: 889,820

[22] Filed: Mar. 24, 1978

[51] Int. Cl.² .......................... B32B 3/12; B32B 3/10; E04B 1/99
[52] U.S. Cl. ................................. 428/116; 428/131; 428/138; 181/290; 181/292
[58] Field of Search ................. 428/73, 116, 131, 138, 428/178; 181/290, 292

[56] References Cited

U.S. PATENT DOCUMENTS

| | | | |
|---|---|---|---|
| 3,351,154 | 11/1967 | Kodaras | 181/292 |
| 3,481,427 | 12/1969 | Dobbs et al. | 181/292 |
| 3,630,312 | 12/1971 | Woodward et al. | 181/292 |
| 3,687,223 | 8/1972 | Streck | 181/292 |
| 3,821,999 | 7/1974 | Guess et al. | 428/116 X |
| 3,831,710 | 8/1974 | Wirt | 181/292 X |
| 3,887,031 | 6/1975 | Wirt | 428/178 X |
| 3,905,443 | 9/1975 | Sieuzac | 181/291 |
| 3,972,383 | 8/1976 | Green | 181/292 X |

*Primary Examiner*—George F. Lesmes
*Assistant Examiner*—Daniel R. Zirker
*Attorney, Agent, or Firm*—Daniel Jay Tick

[57] ABSTRACT

A plurality of sound absorbing units are provided in alternate compartments of a lattice-type structure. Each of the sound absorbing units comprises four concave strip segments each extending from the midpoint of a corresponding one of the strip segments of a corresponding one of the square open compartments of the structure to the midpoint of a corresponding other of the strip segments of the corresponding one of the compartments to form a concave-sided square in the one of the compartments rotated 90° relative to the one of the compartments.

1 Claim, 2 Drawing Figures

SOUND ABSORBING DEVICE

BACKGROUND OF THE INVENTION

The present invention relates to a sound absorbing device.

Sound absorbing devices are disclosed in U.S. Pat. Nos. 3,351,154; 3,639,106; 3,834,487; 3,887,031; 3,905,443 and 4,035,535.

Objects of the invention are to provide a sound absorbing device of simple structure, which is inexpensive in manufacture, made from simple and readily available materials, and functions efficiently, effectively and reliably to absorb sound thereby relieving sound pollution in the air.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
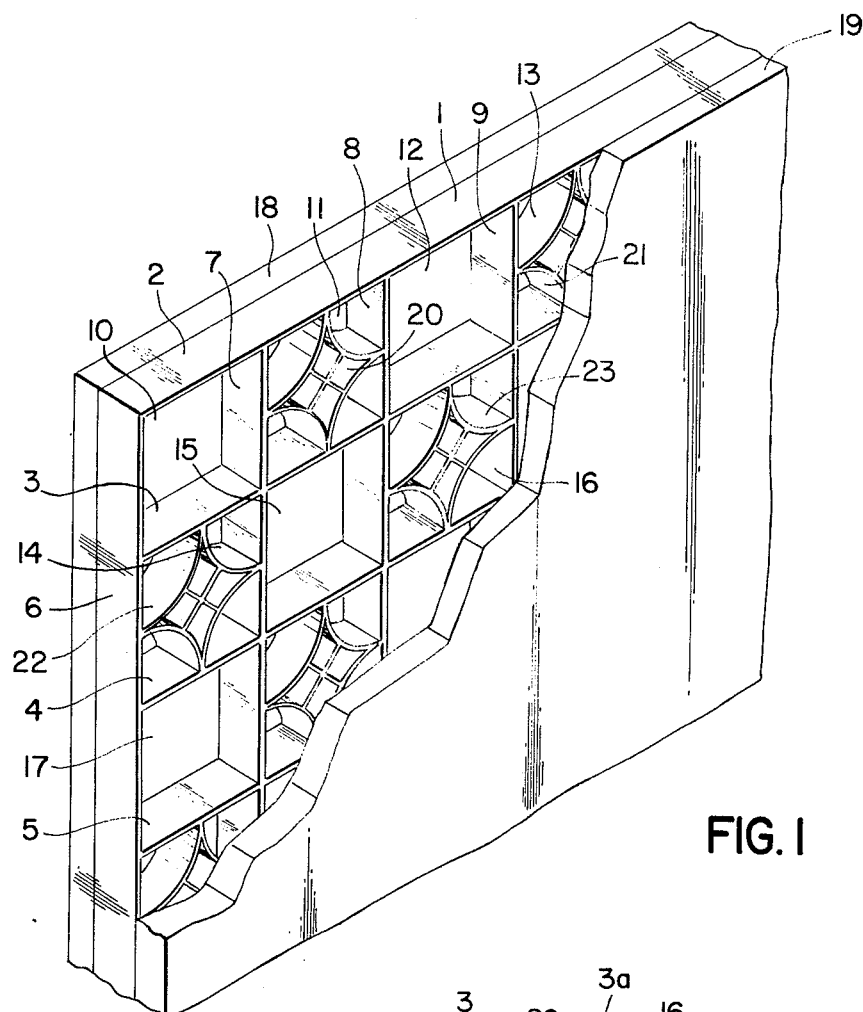
FIG. 1 is a view, partly cutaway, of an embodiment of the sound absorbing device of the invention.

The sound absorbing device of the invention comprises a lattice-type structure 1 having a plurality of equidistantly spaced parallel horizontal strips 2, 3, 4, 5, and so on, and a plurality of equidistantly spaced parallel vertical strips 6, 7, 8, 9, and so on, intersecting the horizontal strips at right angles, as shown in FIG. 1. The horizontal and vertical strips intersect each other to form a matrix structure, shown in FIG. 1, having a plurality of substantially square open compartments 10, 11, 12, 13, 14, 15, 16, 17, and so on.

Figure 2:
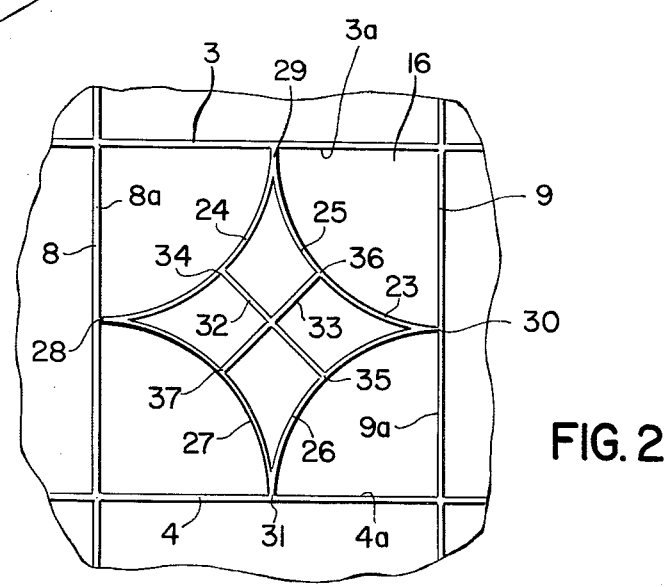
FIG. 2 is a view, on an enlarged scale, of a sound absorbing unit of the embodiment of FIG. 1.

Each of the square open compartments of the matrix structure 1 is bordered by a pair of spaced parallel horizontal strip segments and a pair of spaced parallel vertical strip segments. Thus, for example, the square open compartment 16 of the matrix structure, shown in detail in FIG. 2, is bordered by a pair of spaced parallel horizontal strip segments 3 and 4 and the pair of spaced parallel vertical strip segments 8 and 9.

The matrix structure 1 consists of any suitable material such as, for example, plastic, and may be molded, as an integral unit. The open sides of the matrix structure 1 are covered by sheets 18 and 19 of plastic material, thereby providing a completely enclosed integral structure (FIG. 1).

A plurality of sound absorbing units 20, 21, 22, 23, and so on, are provided in alternate compartments 11, 13, 14, 16, and so on, of the matrix structure 1. Each of the sound absorbing units, as shown in FIG. 2, comprises four concave strip segments 24, 25, 26 and 27. The concave strip segment 24 extends from the midpoint 28 of the strip segment 8a of the compartment 16 to the midpoint 29 of the strip segment 3a of said compartment. The concave strip segment 25 extends from the midpoint 29 of the strip segment 3a of the compartment 16 to the midpoint 30 of the strip segment 9a of said compartment. The concave strip segment 26 extends from the midpoint 30 of the strip segment 9a of the compartment 16 to the midpoint 31 of the strip segment 4a of said compartment. The concave strip segment 27 extends from the midpoint 31 of the strip segment 4a of the compartment 16 to the midpoint 28 of the strip segment 8a of said compartment. The concave strip segments 24, 25, 26 and 27 thus form a concave-sided square in the compartment 16, rotated 90° relative to said compartment.

Each of the sound absorbing units further comprises a pair of intersecting cross strip segments extending between the midpoints of opposite concave strip segments of its concave sides. Thus, as shown in FIG. 2, the sound absorbing unit 23 further comprises a pair of intersecting cross strip segments 32 and 33. The cross strip segment 32 extends between the midpoints 34 and 35 of opposite concave strip segments 24 and 26, respectively, of the concave sides of the sound absorbing unit 23. The cross strip segment 33 extends between the midpoints 36 and 37 of opposite concave strip segments 25 and 27, respectively, of the concave sides of the sound absorbing unit 23.

While the invention has been described by means of a specific example and in a specific embodiment, I do not wish to be limited thereto, for obvious modifications will occur to those skilled in the art without departing from the spirit and scope of the invention.

I claim:

1. A sound absorbing device, comprising a lattice-type structure having a plurality of equidistantly spaced parallel horizontal strips and a plurality of equidistantly spaced parallel vertical strips intersecting the horizontal strips at right angles to form a matrix structure having a plurality of substantially square open compartments each bordered by a pair of spaced parallel horizontal strip segments and a pair of spaced parallel vertical strip segments, a plurality of sound absorbing units in alternate compartments of the structure each of the sound absorbing units comprising four concave strip segments each extending from the midpoint of a corresponding one of the strip segments of a corresponding one of the compartments to the midpoint of a corresponding other of the strip segments of the corresponding one of the compartments to form a concave-sided square in said one of said compartments rotated 90° relative to said one of said compartments, each of the sound absorbing units further comprising a pair of intersecting cross strip segments extending between the midpoints of opposite concave strip segments of its concave sides, and a pair of sheets covering the open sides of the matrix structure, thereby providing a completely enclosed integral structure.

* * * * *